O. HEINS.
MAGNETO DYNAMO UNIT.
APPLICATION FILED AUG. 12, 1915.
1,250,870.
Patented Dec. 18, 1917.
3 SHEETS—SHEET 1.
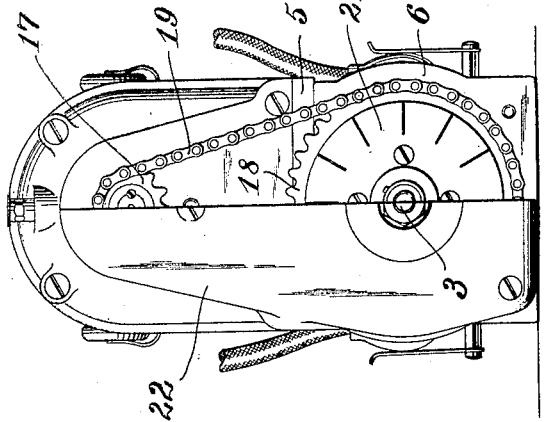
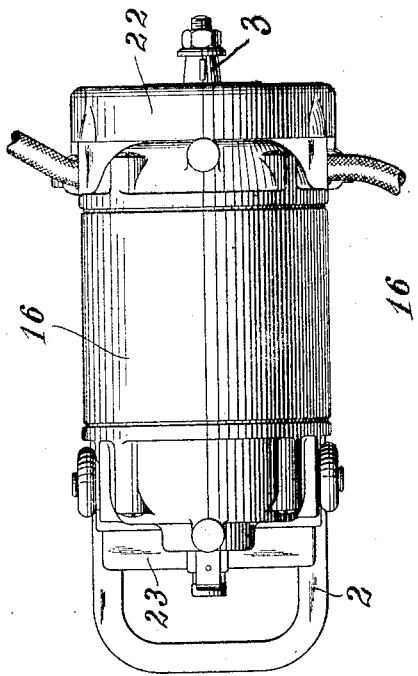
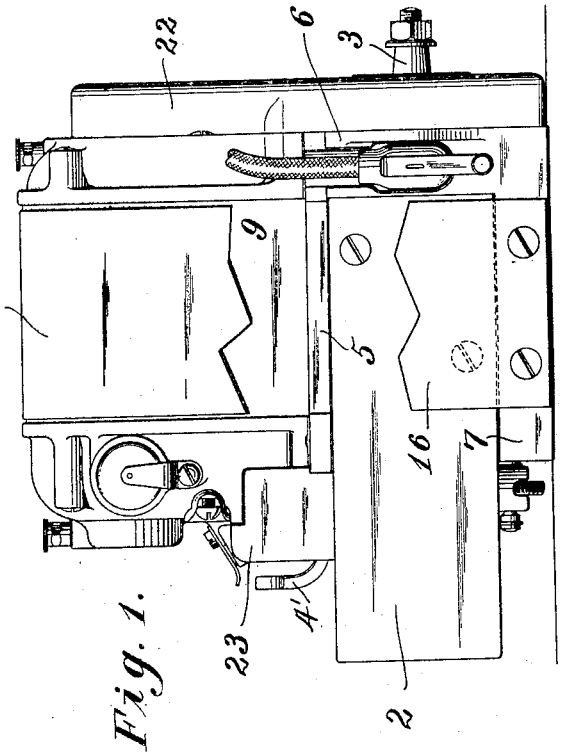
INVENTOR
Otto Heins
BY
Lennie Davis & Marvin
ATTORNEYS

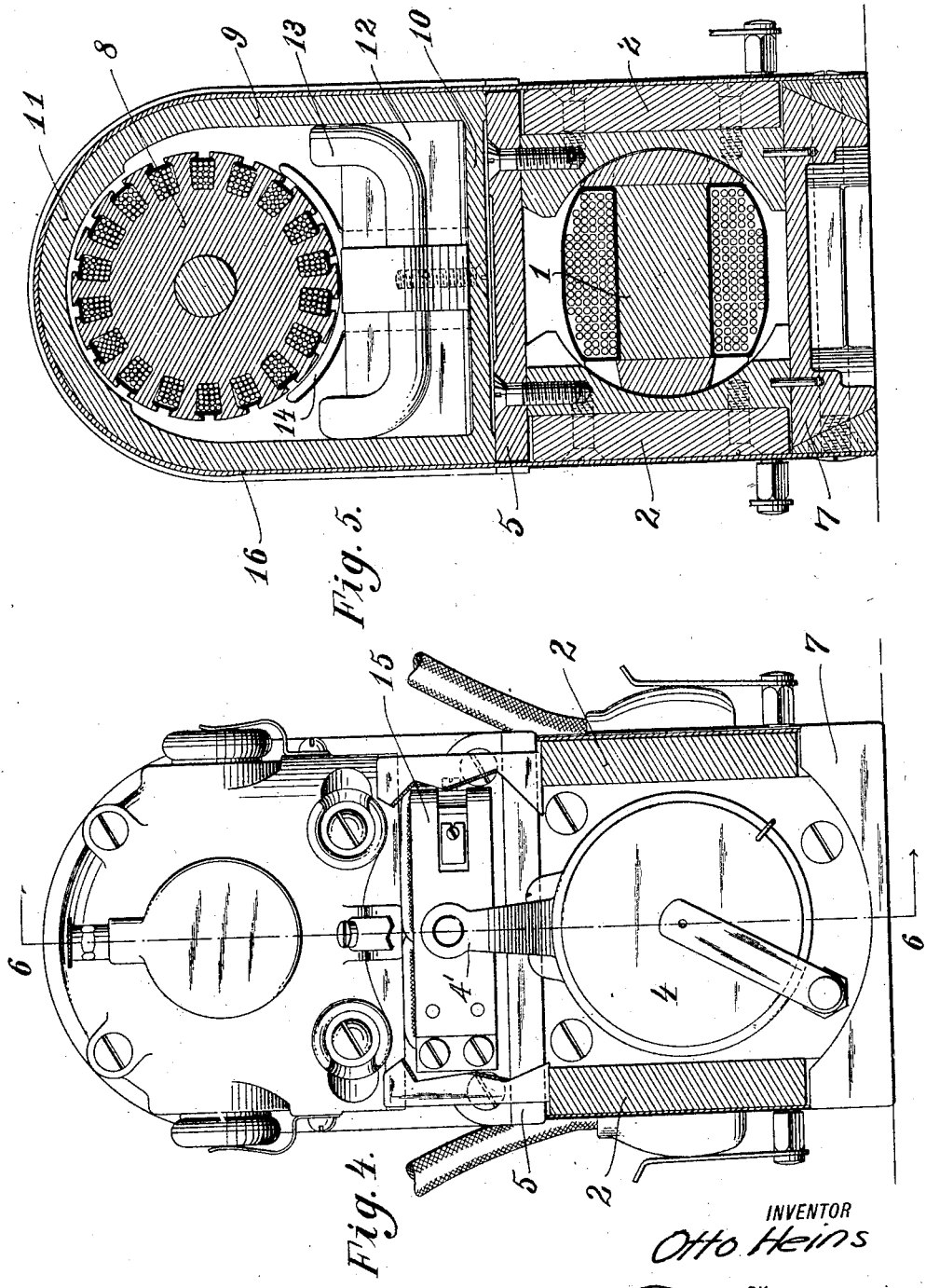

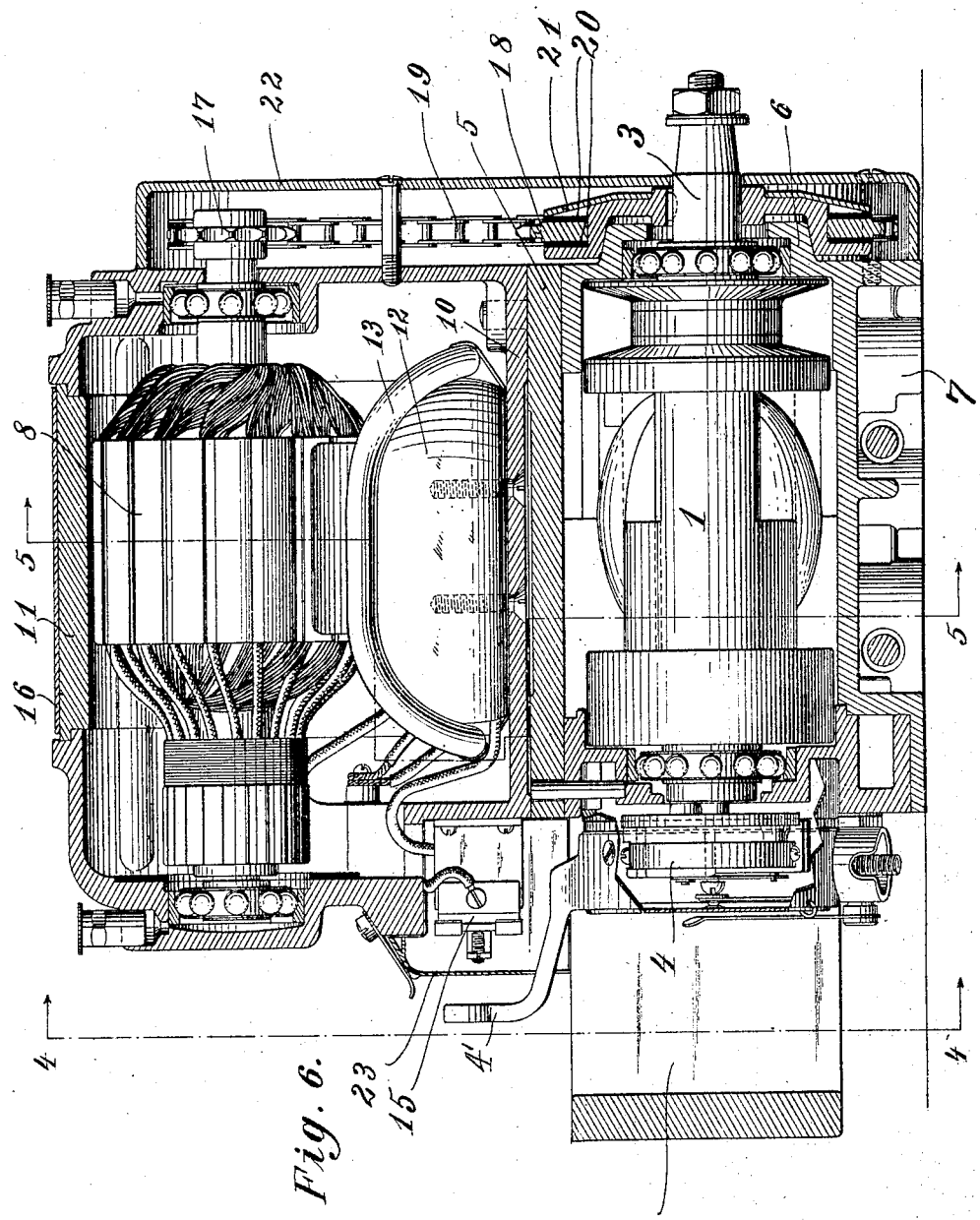

UNITED STATES PATENT OFFICE.

OTTO HEINS, OF NEW YORK, N. Y., ASSIGNOR TO BOSCH MAGNETO COMPANY, OF NEW YORK, N. Y., A CORPORATION OF NEW YORK.

MAGNETO-DYNAMO UNIT.

1,250,870.      Specification of Letters Patent.      Patented Dec. 18, 1917.

Application filed August 12, 1915. Serial No. 45,211.

*To all whom it may concern:*

Be it known that I, OTTO HEINS, a subject of the Emperor of Germany, residing in the city, county, and State of New York, have invented certain new and useful Improvements in Magneto-Dynamo Units; and I do hereby declare the following to be a full, clear, and exact description of the invention, such as will enable others skilled in the art to which it appertains to make and use the same.

It is now customary to provide a direct current dynamo for furnishing current to the incandescent lamps and storage battery on moving vehicles such as automobiles, motor boats, cycle cars and motor cycles. This dynamo is of small capacity and its best speed is about two to four times the speed of the internal combustion engine which drives it and the vehicle. The magneto furnishing ignition current to the spark plugs is likewise driven by the engine but its speed, unlike the speed of the dynamo, must be in fixed ratio with the speed of the engine and when of the bipolar type the speed must be equal thereto for a four cylinder, four cycle engine, and one-half thereof for a two cylinder, four cycle engine. For these reasons, it is undesirable to arrange the armatures of the magneto and dynamo on the same shaft, and prior equipments so designed are not well adapted for the purpose. Furthermore, the magneto should have a permanent field, so as to generate satisfactory sparking voltages at the lowest possible speed in starting and running, and also so as to provide a substantially constant field strength at all speeds and thus furnish more intense ignition at the higher speeds of the engine when the time for combustion is less. In contradistinction to these requirements, the lighting dynamo should, at all running speeds, generate a substantially constant voltage, or produce a substantially constant current, depending upon the system of regulation, and it is usual to do this by regulating the field strength in such manner as to compensate for the varying speed of the engine. Thus it has been found after considerable experimentation, that the consolidation of the magnetic circuits of the magneto and dynamo is detrimental to the best performance of the magneto or of dynamo, or of both. It follows, therefore, that combination equipments in which the permanent magnet of the magneto forms even a part of the magnetic circuit of the dynamo are not well adapted for the purpose. In the invention herein disclosed, the disadvantageous construction of the prior art is avoided by providing a complete and adequate magnetic circuit for both machines, a permanent magnet, preferably of the U-form, being employed for the magneto, and an electrically excited magnetic circuit of comparatively soft iron or steel being employed for the dynamo; and preferably the two are magnetically separated, as for instance by the interposition between the two magnetic structures of material of relatively low permeability.

In addition to the foregoing requirements, the magneto and dynamo should be compacted so far as possible, and also reduce to such overall dimensions as to be capable of nice association with the engine and its auxiliaries. This is especially true in the case of a motor cycle where space is very limited, and where the supported weight should be a minimum. Moreover, the driving connection between the magneto and dynamo should be as simple as possible, so as to render the installation light, quiet and efficient. I attain these additional objects in the preferred form of construction by arranging the axis of the magneto armature along the length of the magnet arms, and by fastening the dynamo to the magneto along one of its four sides and in such manner that the two armatures rotate on parallel axes in geared connection with each other. In this way, the mechanical interrupter on the armature shaft of the magneto may be arranged within the arch of the magneto in an accessible but well protected position, while the outer end of that shaft is adapted for coupling to the engine and for the use of a chain or other form of gearing for driving the dynamo armature. Furthermore, the width and the length of the permanent magnet of a magneto of this kind conforms to the width and length of the dynamo described hereinafter, so that not only is the unit compacted and of desirable overall dimensions, but the parts are well protected and accessible.

These and other features of novelty are disclosed hereinafter in connection with the accompanying drawings which illustrate the preferred embodiment of my invention as a magneto dynamo unit suitable for a motor cycle or cycle car and comprising a lighting dynamo and a high tension magneto for an engine having V-arranged cylinders, as an example. In these drawings, Figure 1 represents a side elevation of the unit;

Fig. 2 represents a top plan view thereof;

Fig. 3 represents an elevation of the outer end of the unit, with part of the gear housing removed to show the driving gearing;

Fig. 4 represents, on an enlarged scale, an elevation of the inner end of the unit, with the magnet arms in section on line 4—4 of Fig. 6;

Fig. 5 represents a sectional elevation on line 5—5 of Fig. 6; and

Fig. 6 represents a view, partly in section and partly in elevation, along the central longitudinal plane of the unit.

The magneto is of the high tension type with an armature and mechanical interrupter as shown in the United States patent to Gottlob Honold, No. 974,967 for generating sparking voltages at the irregular intervals required by V-arranged cylinders of a motor cycle engine. By arranging the armature 1 of the magneto along the length of the arms 2 of the permanent magnet, the magnet is narrower and longer than the usual type in which the armature extends at right angles to the length of the arms, and these new proportions aid in producing the desired proportions of the complete unit. The outer end of the armature shaft 3 is adapted for coupling to the engine, and at its inner end it carries the adjustable mechanical interrupter 4 within the arch of the magnet where it is accessible for inspection, repair and spark adjustment, and is well protected from mechanical injury. The timing lever 4' extends upwardly and to one side of the dynamo in convenient position for connection with the spark adjusting lever.

The members 5, 6 and 7 of aluminum, form a frame of U-shape fastened to the magneto. The arm 5 sets on the open side of the magnet across the two arms thereof and magnetically separates the magneto and dynamo. The intermediate part 6 is fastened across the ends of the magnet arms and supports the outer bearing for the magneto armature. The arm 7 sets parallel to the arm 5 on the opposite side of the magnet and forms the base for the complete unit.

The lighting dynamo is of the same width as the magneto, as can be best seen in Figs. 4 and 5, and its length along the arms of the magnet is such as to provide accessibility to the mechanical interrupter 4, as can best be seen from Fig. 6. The dynamo extends across one of the four sides of the magneto and has its armature 8 rotatable on an axis parallel to the axis of rotation of the magneto armature 1. The yoke 9 of comparatively soft iron or steel has a flat base 10 fastened on the arm 5 of the aluminum frame. The arch 11 of the yoke forms a consequent pole of the dynamo and the field circuit is excited by a shunt coil 12 and a series turn 13 mounted on the upwardly projecting pole 14. This arrangement results in a dynamo of comparatively small height and of a width and length conforming to the lines of the magneto, especially when the dynamo is mounted, as shown, on the open side of the permanent magnet. The flat base 10 of the dynamo aids materially in forming a compact unit capable of being nicely associated with the engine and its auxiliaries in a motor cycle. The arrangement also provides a convenient and accessible place for the automatic switch 15, which cuts the dynamo in and out of the circuit at the proper time in the well known way. The dynamo is securely held in position on the magneto by a brass strap 16. By arranging the two armatures 1 and 8 on parallel axes of rotation, the driving gearing is simplified. The gears 17 and 18 carried on the outer ends of the armature shafts are of the proper speed ratio, and the chain 19 which operatively connects those gears, is short and light. The gear 17 is fast on the shaft of the dynamo armature 8, but the gear 18 is connected to the magneto armature shaft 3 through a slip clutch embodying two friction rings 20 loose on the shaft and a spring plate 21 fast to the shaft. The slip clutch permits the gear 18 to slip during starting and during periods of excessive acceleration or retardation of the dynamo, thereby safeguarding the chain 19 and relieving the magneto shaft 3 and the engine of excessive load at certain times. The gearing 17, 18, 19 is inclosed by a housing member 22 and the automatic switch 15 is inclosed by the housing member 23.

From the foregoing it will now be apparent that I have disclosed specifically a magneto dynamo unit which is compact and of suitable overall dimensions for nice association with the engine and auxiliaries of a motor cycle. Also, I have disclosed a unit of this kind in which both the magneto and the dynamo are efficient in operation and together with their auxiliary parts are accessible but well protected from mechanical injury. Furthermore, the arrangement is such that the driving gearing is simple of construction and quiet in operation.

Having thus described my invention, what I claim is:

1. In a magneto dynamo unit, a magneto having a permanent magnet of U-form and an armature with its axis extending along the length of the arms of the magnet, a dynamo mounted on the permanent magnet of the magneto and having the axis of its armature parallel to the axis of the armature of the magneto, and gearing operatively connecting the two armatures, the field magnet of the dynamo being magnetically separated from the permanent magnet of the magneto.

2. In a magneto dynamo unit, a magneto having a permanent magnet of U-form and an armature with its axis extending along the length of the arms of the magnet, a dynamo attached to the permanent magnet and having the axis of its armature parallel to the axis of the armature of the magneto, a member of non-magnetic material interposed between the magneto and dynamo and magnetically separating them, and gearing operatively connecting the two armatures.

3. In a magneto dynamo unit, a magneto having a permanent magnet of U-form, a dynamo attached to the permanent magnet, a member of non-magnetic material interposed between the dynamo and magneto and magnetically separating them, and gearing operatively connecting the armatures of the magneto and dynamo.

4. In a magneto dynamo unit, a magneto having a permanent magnet of U-form, a dynamo positioned along one side of the permanent magnet, gearing operatively connecting the armatures of the magneto and dynamo, and a U-frame of non-magnetic material having one arm interposed between the magneto and dynamo and magnetically separating them, a second arm forming a base for the unit, and an intermediate part connecting the two arms.

5. In a magneto dynamo unit, a magneto having a permanent magnet of U-form and an armature with its axis extending along the length of the arms of the magnet, a dynamo fastened in place along one side of the permanent magnet and having the axis of its armature parallel to the axis of the armature of the magneto, gearing operatively connecting the two armatures, and a U-frame of non-magnetic material comprising one arm interposed between the magneto and dynamo, a second arm forming a base for the unit, and an intermediate part supporting a magneto armature bearing at the ends of the arms of the permanent magnet.

6. In a magneto dynamo unit, a magneto having a permanent magnet of U-form, a dynamo fastened thereto and having a yoke with a flat base positioned along one side of the permanent magnet, a member of non-magnetic material interposed between the magneto and the base of the dynamo and magnetically separating them, and gearing operatively connecting the armatures of the magneto and dynamo.

7. In a magneto dynamo unit, a magneto having a permanent magnet of U-form and an armature with its axis extending along the length of the arms of the magnet, a dynamo positioned above the space between the arms of the magnet for a part only of the length thereof from the outer ends of the arms, driving gearing on the outer end of the magneto operatively connecting the armatures of the magneto and dynamo, an exposed mechanical interrupter located within the arch of the permanent magnet of the magneto, and a timing lever projecting directly upward from the mechanical interrupter along the side of the dynamo opposite the driving gearing therefor.

8. A combined magneto and dynamo unit comprising the combination of a magneto consisting of a permanent magnet and an armature mounted in bearings for rotation between the poles of the permanent magnet with its axis parallel to the length of the arms of the magneto, a dynamo attached to the permanent magnet with its axis of rotation parallel to the axis of rotation of the magneto armature and having an electromagnetic field, and gearing connecting the shafts of the magneto and dynamo, the magneto and dynamo having their fields magnetically separated from each other so as to be unaffected one by the other.

9. A combined magneto and dynamo unit comprising the combination of a magneto having a permanent magnet of U-form and an armature mounted in bearings for rotation between the poles of the permanent magnet, a dynamo positioned along one side of the permanent magnet with its axis of rotation parallel to the axis of rotation of the magneto armature and having an electromagnetic field, gearing connecting the shafts of the magneto and dynamo, and a non-magnetic member interposed between the magneto and the dynamo, the magneto and dynamo being rigidly secured together with the non-magnetic member between them, whereby a unitary structure is produced in which the fields of the magneto and the dynamo are unaffected one by the other.

10. A combined magneto and dynamo unit comprising the combination of a magneto consisting of a permanent magnet and an armature mounted in bearings for rotation between the poles of the permanent magnet with its axis parallel to the length of the arms of the magnet, a dynamo mounted on the permanent magnet with its axis of rotation parallel to the axis of rotation of the magneto armature, gearing connecting the shafts of the magneto and dynamo, and a non-magnetic member interposed between the magneto and dynamo, the magneto and dynamo being rigidly secured together with the non-magnetic member between them, whereby a unitary structure is produced in which the fields of the magneto and dynamo are unaffected one by the other.

11. A combined magneto and dynamo unit comprising the combination of a magneto consisting of a permanent magnet of U-form and an armature mounted in bearings for rotation between the poles of the permanent magnet, a dynamo having its axis of rotation parallel to the axis of rotation of the magneto armature and having an electrically excited field member with a flat base positioned along one side of the permanent magnet of the magneto, gearing connecting the shafts of the magneto and dynamo, and a non-magnetic member interposed between the magneto and the flat base of the dynamo, the magneto and dynamo being rigidly secured together with the non-magnetic member between them, whereby a unitary structure is produced in which the fields of the magneto and dynamo are unaffected one by the other.

12. A combined magneto and dynamo unit comprising the combination of a magneto consisting of a permanent magnet of U-form and an armature mounted in bearings for rotation between the poles of the magnet with its axis parallel to the length of the arms of the magnet, a dynamo positioned above the space between the arms of the magnet for a part only of the length thereof from the outer ends of the arms, gearing connecting the shafts of the magneto and dynamo, an exposed mechanical interrupter located within the arch of the permanent magnet, and a timing lever projecting directly upward from the mechanical interrupter along the side of the dynamo opposite the driving gearing therefor.

In testimony whereof I affix my signature.

OTTO HEINS.

Witnesses:
 ROLF LINDENHAYN,
 LEON F. ACKER.